United States Patent
Banks et al.

(10) Patent No.: US 6,990,925 B2
(45) Date of Patent: Jan. 31, 2006

(54) DEER AND GAME FEEDER

(76) Inventors: J. Lamar Banks, 2909 Lock Lomond Dr., Conyers, GA (US) 30094; Jefferson Lamar Banks, III, 1765 Pierce Dairy Rd., Madison, GA (US) 30650; Patrick Hayes, P. O. Box 2305, Covington, GA (US) 30015

( * ) Notice: Subject to any disclaimer, the term of this patent is extended or adjusted under 35 U.S.C. 154(b) by 123 days.

(21) Appl. No.: 10/766,508

(22) Filed: Jan. 28, 2004

(65) Prior Publication Data

US 2004/0244702 A1 Dec. 9, 2004

Related U.S. Application Data

(60) Provisional application No. 60/444,217, filed on Jan. 30, 2003.

(51) Int. Cl.
*A01K 5/00* (2006.01)

(52) U.S. Cl. .................. 119/61.3; 119/61.1; 119/61.57
(58) Field of Classification Search ................. 47/25.1, 47/70; 248/163.1, 164, 431, 440, 237, 219.1; 211/206, 119.01; 119/61.3, 61.1, 58, 59, 61.57, 119/514, 499
See application file for complete search history.

(56) References Cited

U.S. PATENT DOCUMENTS

| 35,259 | A |   | 5/1862 | Ralston |   |
|---|---|---|---|---|---|
| 44,205 | A |   | 9/1864 | Lippy |   |
| 45,011 | A | * | 11/1864 | Allerton | 119/58 |
| 53,634 | A | * | 4/1866 | Lamb | 119/58 |
| 53,811 | A | * | 4/1866 | Goudy | 119/58 |
| 58,529 | A | * | 10/1866 | Woodbury | 119/58 |
| 62,522 | A |   | 3/1867 | Blanchard |   |
| 294,600 | A | * | 3/1884 | Evesson | 52/64 |
| 436,112 | A | * | 9/1890 | Atkinson | 119/58 |
| 933,384 | A | * | 9/1909 | McCollough | 119/61.3 |
| 2,686,494 | A | * | 8/1954 | Garman | 119/58 |
| 3,249,090 | A | * | 5/1966 | Ripley | 119/52.1 |
| 4,065,195 | A |   | 12/1977 | Fahmie |   |
| 4,070,991 | A |   | 1/1978 | Schmiesing |   |
| 5,195,458 | A |   | 3/1993 | Black et al. |   |
| 5,794,561 | A |   | 8/1998 | Schulz |   |

* cited by examiner

*Primary Examiner*—T. Nguyen
(74) *Attorney, Agent, or Firm*—Gardner Groff, P.C.

(57) ABSTRACT

A portable deer and game feeder includes a tub-like feeder box, a support frame for supporting the feeder box, the support frame including a plurality of removable legs for supporting the feeder box above the ground, and a roof extending over the feeder box and being large enough to overhang the edges of the feeder box. A plurality of removable roof support posts are provided for supporting the roof over the feeder box, and the removable legs and the removable roof supports are sized and configured to be detached and stowed in the feeder box for transport.

16 Claims, 6 Drawing Sheets

DEER AND GAME FEEDER

BACKGROUND OF THE INVENTION

Deer hunters prefer to shoot large and healthy deer and other game to obtain the largest amount of good-tasting meat and the best trophies. For deer to grow large and meaty, they need to eat a good quantity and quality of food. To help deer eat well, hunters sometimes set up deer feeders in fields and stock the feeders with nutritious deer feed. Such deer feed is typically corn feed, high protein feed, or other feed for supplementing the deer's diet. The feeders are used before, but usually not during, deer season, so they typically are transported from the field just before the season opens and then transported back out to the field and set up again after the end of the season.

Some simple deer feeders include wooden boxes and metal barrels for holding the feed. Another type of deer feeder has a container for the feed and a slinger device for slinging the feed from the container out to the area around the feeder. And yet another type of deer feeder has a container for the feed that is suspended above the ground. All of these feeders are useful in providing nutritious feed to deer to help them grow large and healthy. But they are generally heavy and bulky to transport and time-consuming to assemble and disassemble.

Accordingly, there is yet a need for a deer and game feeder that can be assembled and disassembled in the field quickly and easily and that is lightweight and compact when disassembled for ease of transporting and storing. It is to the provision of such a deer and game feeder that the present invention primarily is directed.

SUMMARY OF THE INVENTION

Briefly described, in a preferred illustrative form the present invention comprises a portable deer and game feeder. The feeder includes a tub-like feeder box and a support frame for supporting the feeder box above the ground. Preferably, the support frame includes a plurality of removable legs for supporting the feeder box. A roof extends over the feeder box and is large enough to overhang the edges of the feeder box. Preferably, a plurality of removable roof support posts are provided for supporting the roof over the feeder box. Advantageously, it is preferred that the removable legs and the removable roof supports are sized and configured to be detached and stowed in the feeder box, as for storage and transport.

Preferably, the feeder includes a roof that has two roof panels that are hinged together, such that the roof panels extend over the feeder box to a substantial degree in use and can be folded against one another to be positioned atop the feeder box like a lid for storage.

In one form, it is preferred that the feeder box portion of the feeder is in the form of a one-piece, tub like element. However, other configurations for the feeder box can be employed. Also, the feeder box can be made of a molded plastic element.

In one form, the roof is made up of at least two half roof portions which are hinged together, with one of the half roof portions at least partially overlapping the other.

The feeder of the present invention can be set up in the field easily and quickly. Also, it can be broken down in the field easily and quickly. Advantageously, the feeder of the present invention is compact and lightweight. It also is effective for protecting the feed contained in the feeder box from weather, in particular from getting wet. These and other features and advantages of the present invention will become more apparent upon reading the following specification in conjunction with the accompanying drawing figures.

BRIEF DESCRIPTION OF THE DRAWING FIGURES

DETAILED DESCRIPTION OF THE INVENTION

Figure 1:
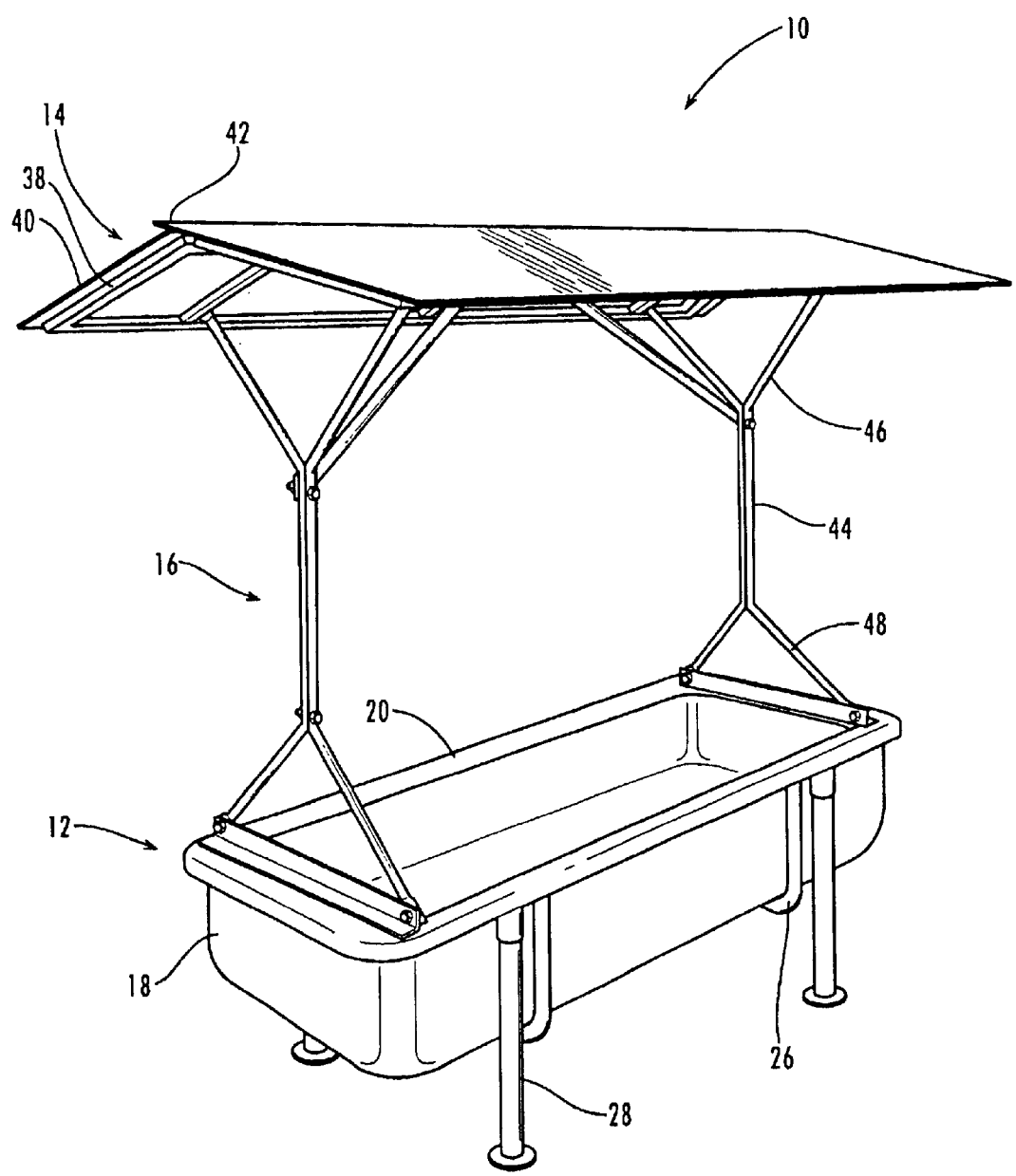
FIG. 1 is a schematic, perspective illustration of a deer and game feeder according to one aspect of the invention.

Referring now to the drawing figures, wherein like reference numerals represent like parts throughout the several views, FIGS. 1–12 illustrate an exemplary embodiment of the present invention, referred to generally as the feeder 10. The feeder 10 is well suited for feeding deer and other wildlife, but it can be used in other applications. For example, the feeder 10 could be used for outdoor feeding of livestock, domesticated animals, or even pets.

Figure 2:
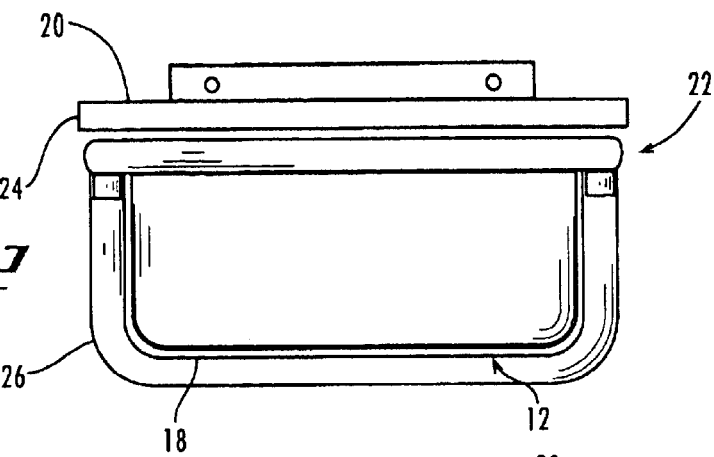
FIG. 2 is a schematic, front view of a portion of the deer and game feeder of FIG. 1.
Figure 3:
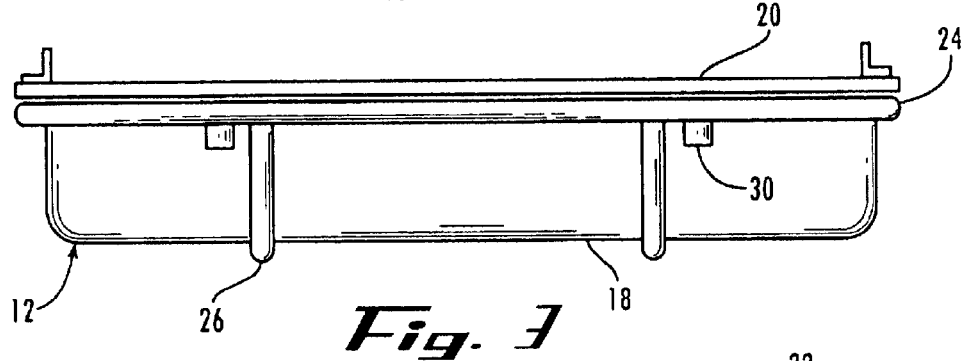
FIG. 3 is a schematic, side view of a portion of the deer and game feeder of FIG. 1.

As shown in FIG. 1, the feeder 10 includes a feed box 12 for holding animal food, a roof 14 for covering the feed box, and roof supports 16 mounted to the feed box and the roof. As shown in FIGS. 1–3, the feed box 12 is a one-piece molded plastic tub with a rectangular body 18 and a peripheral lip 20. In a typical commercial embodiment, the feed box tub is 24 inches wide and 60 inches long. It will be understood that the feed box 12 can be round, polygonal, or another regular or irregular shape with other dimensions, can be made of fiberglass or another material selected for low weight and high strength, and can be provided in configurations other than a one-piece tub.

Figure 4:
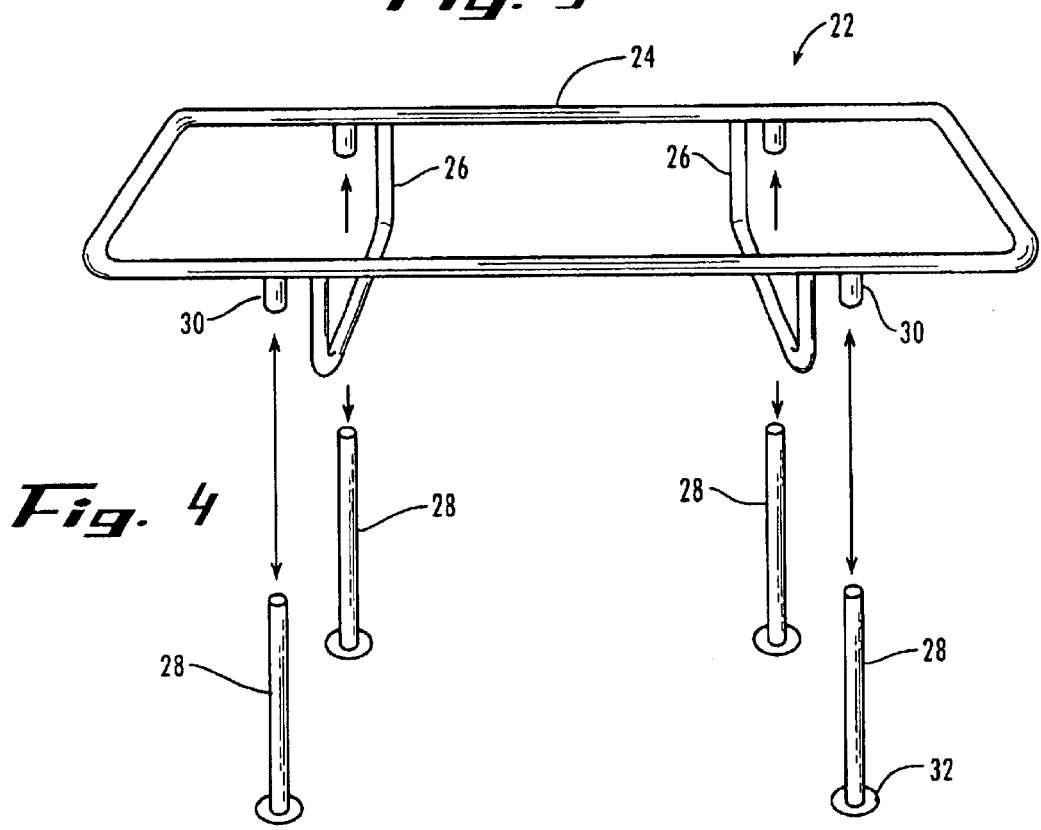
FIG. 4 is a partly-exploded perspective view of a portion of the deer and game feeder of FIG. 1.

As best shown in FIGS. 2–4, the feeder 10 includes a feed box frame 22 for supporting the feed box 12 in a nested arrangement. The feed box frame 22 has a peripheral member 24 for supporting the feed box peripheral lip 20, unshaped rib members 26 for supporting the feed box body 18, and legs 28 for positioning the feed box 12 up off the ground. The feed box 12 can be secured to the frame 22 by bolts, rivets, or other fasteners, or it can rest in the frame without fasteners. In addition, the legs 28 have feet 32 for added stability. Optionally, the feet 32 could be replaced with pointed tips for penetrating the ground or simply done away with.

Preferably, the legs 28 are removably coupled to the peripheral member 24. For example, the feed box frame 22 preferably can have hollow stubs 30 for removably receiving the legs 28. Or the legs 28 may be hollow and slide over the stubs 30. Either way, the legs 28 are sized so that when disassembled from the feed box frame 22, they fit inside the feed box 12. In this way, the legs 28 can be can be stored inside the feed box 12 when the feeder 10 is not being used so that the feeder is compact and easy to store and transport.

In a typical commercial embodiment, the peripheral member 24, the rib members 26, and the legs 28 are made of 1 inch steel conduit or tubing, the stubs 30 are made of pipe clamps or sleeves, and the feet 32 are made of 14 gauge steel plates. The rib members 26 are welded onto the undersides of the peripheral member 24, and the feet 32 are welded onto the legs 28. It will be understood that the frame 22 can be round, polygonal, or another regular or irregular shape with other dimensions, made of fiberglass or another material selected for low weight and high strength, and provided in other configurations than a welded-together framework of steel conduit sections. The legs 28 can be removably attached to the frame 22 in other ways selected for strength and convenience. For example, the legs 28 can be threadedly attached to the frame 22, can be attached using a detent ball arrangement, or in other ways. Also, the legs 28 could be foldably mounted to the frame 22 (in which case it would be preferable to mount the legs between the ribs 26, instead of having the ribs between the legs as shown in the drawings).

Figure 5:
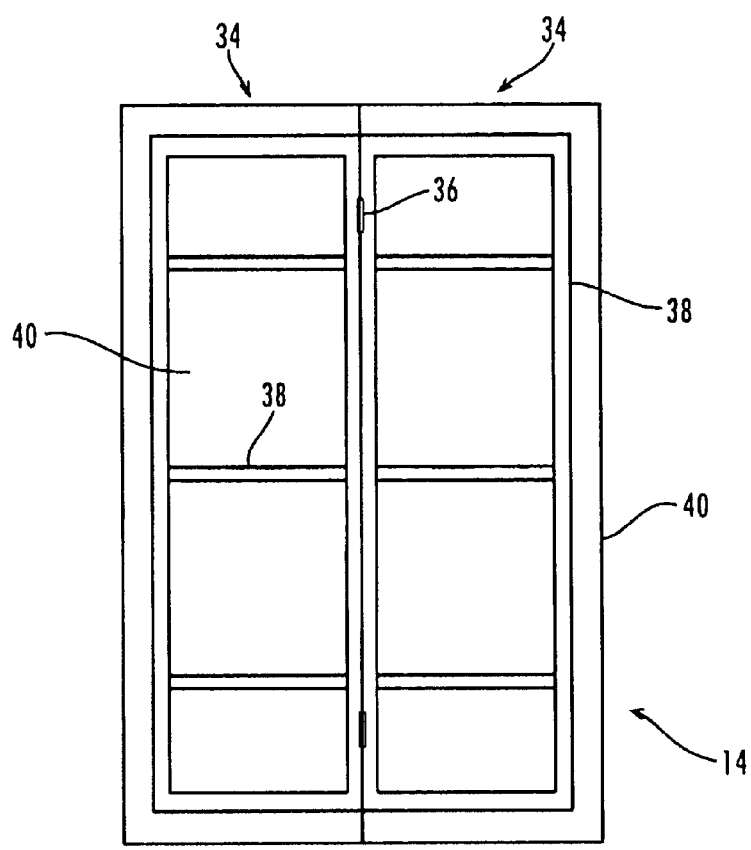
FIG. 5 is a schematic, bottom view of a roof portion of the deer and game feeder of FIG. 1.
Figure 6:
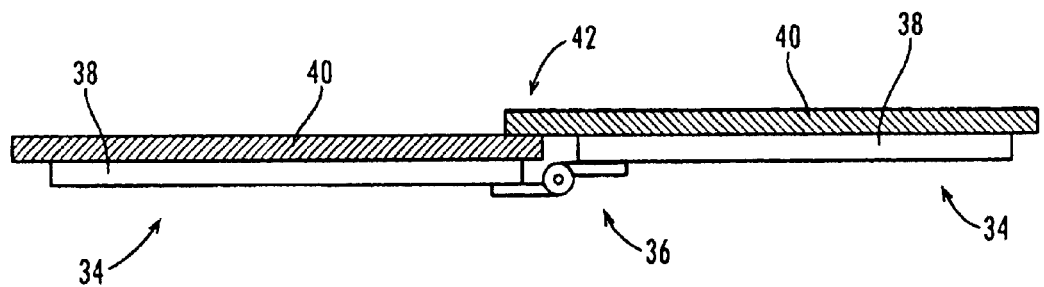
FIG. 6 is a schematic, side view of the roof portion of the deer and game feeder of FIG. 5.
Figure 7:
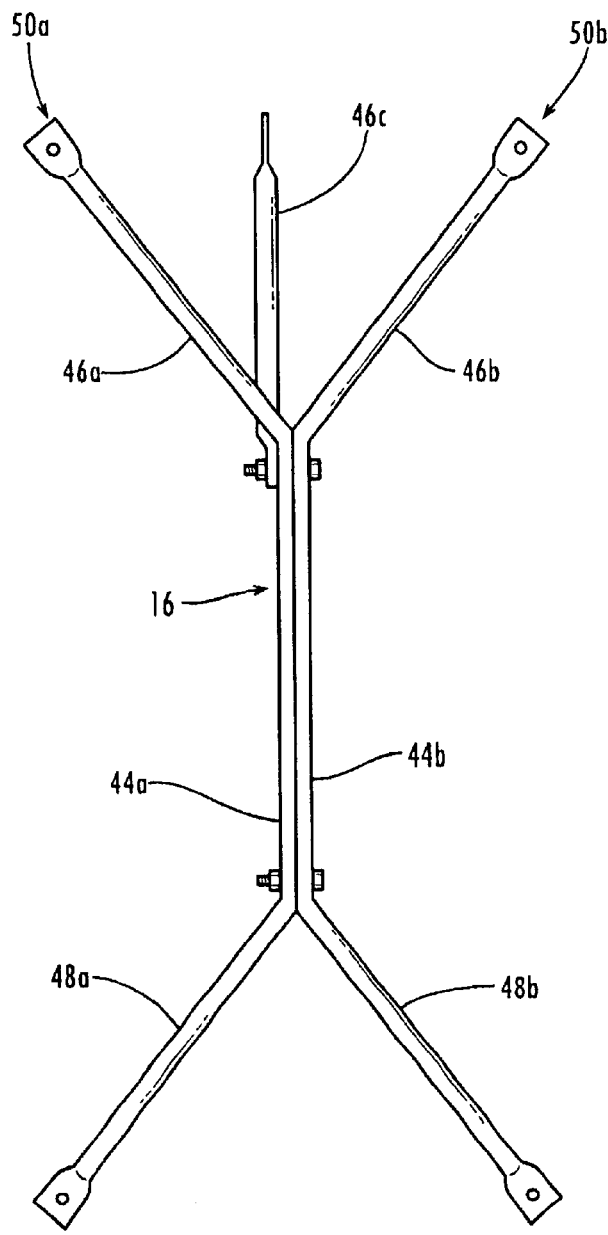
FIG. 7 is a schematic, side view of a roof support portion of the deer and game feeder of FIG. 1.
Figure 8:
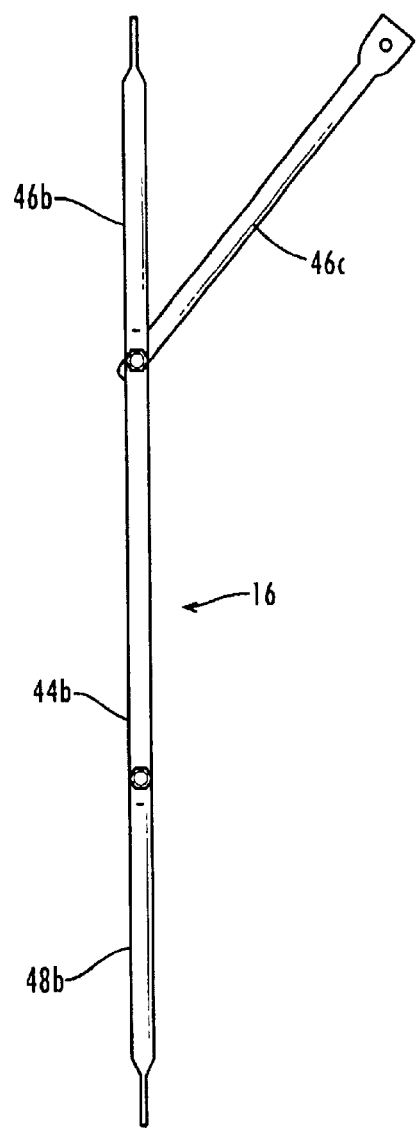
FIG. 8 is a schematic, front view of the roof support portion of the deer and game feeder of FIG. 7.

As shown in FIGS. 1, 5, and 6, the roof 14 includes two panels 34 attached together by hinges 36 or other couplings that permit the panels to swing in a hinged fashion and be collapsed flat with the panels folded over onto each other. The panels 34 are shaped and sized so that, when the feeder 10 is disassembled, the roof 14 can be positioned on or in the feed box 12 as a lid. In this way, the legs 28 placed inside the feed box 12 when the feeder 10 is in storage or transport are prevented from coming out and being lost or damaged.

In a typical commercial embodiment, each roof panel 34 includes a rectangular rigid frame 38 and a rectangular sheet 40 of material attached to the frame. Each frame 38 is made of 14-gauge angle metal (e.g., aluminum, steel, or galvanized iron) that is welded or otherwise connected together. Each sheet 40 is made of plastic and is 30 inches wide, 8 feet long, and ⅛ inch thick. The frames 38 are connected by three or another number of conventional hinges 36, such as butt hinges or piano hinge(s). Preferably, one of the panel sheets 40 has a portion 42 that overlaps the other panel sheet 40 when the panels 34 are unfolded and assembled onto the feeder 10. This overlapping portion 42 covers the gap between the roof panels 34, thereby directing rainwater across the roof 14 and preventing it from leaking between the roof panels 34 and down into the feed box 12. It will be understood that the frames 38 and the sheets 40 can be round, polygonal, or another regular or irregular shape with other dimensions, made of fiberglass or another material selected for low weight and high strength, and provided in other configurations than a two-panel, frame-and-sheet arrangement.

As shown in FIGS. 1 and 7–10, the roof 14 is mounted to the feed box 12 by the roof supports 16. The roof supports 16 are detachably coupled to the feed box 12 and the roof 14. The roof supports 16 are sized and shaped so that when disassembled from the feed box 12 and the roof 14, they fit inside the feed box. In this way, the roof supports 16 can be can be stored inside the feed box 12 when the feeder 10 is not being used so that the feeder is compact and easy to store and transport.

In a typical commercial embodiment, each roof support 16 includes two central segments 44a and 44b (collectively the "central segments 44"), three top end segments 46a, 46b, and 46c (collectively the "top end segments 46"), and two bottom end segments 48a and 48b (collectively the "bottom end segments 48"). The top end segments 46 are angled with respect to each other, and the bottom end segments 48 are angled with respect to each other, thereby providing stability for supporting the roof 14 over the feed box 12. The central segment 44a, the top end segment 46a, and the bottom end segment 48a are provided in the form of an elongate member 50a made of one piece of bent ¾ inch tubing. Similarly, the central segment 44b, the top end segment 46b, and the bottom end segment 48b are provided in the form of an elongate member 50b made of one piece of bent ¾ inch tubing. Top end segment 46c is provided in the form of one piece of ¾ inch tubing that is detachably coupled to the central segments 44 by bolts, screws, pins, or other fasteners that can be installed and removed quickly and easily. It will be understood that the roof supports 16 can be made of fiberglass or another material selected for low weight and high strength, and provided in configurations other than a three-piece bolted-together tubing arrangement as shown in this example.

Figure 9:
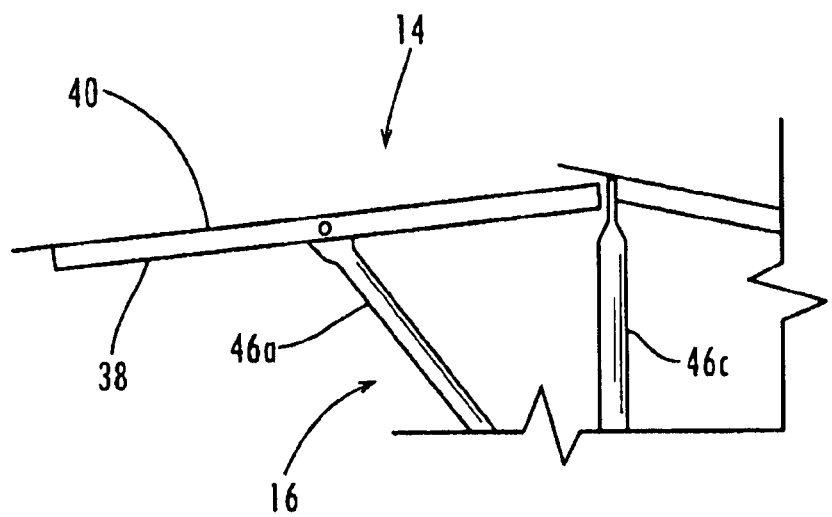
FIG. 9 is a schematic, side view of a portion of the roof support portion of the deer and game feeder of FIG. 7.
Figure 10:
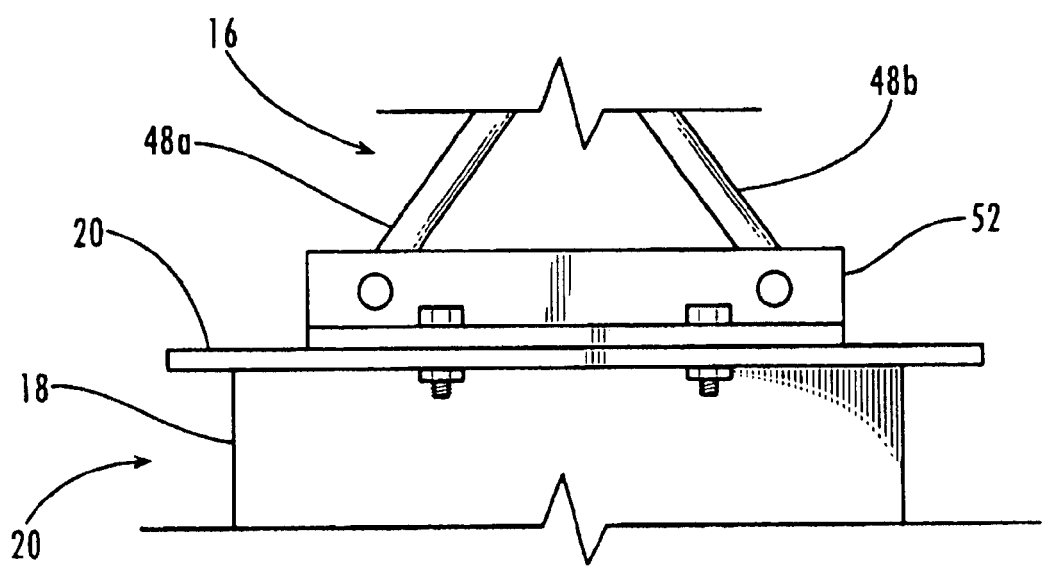
FIG. 10 is a schematic, side view of another portion of the roof support portion of the deer and game feeder of FIG. 7.

As shown in FIG. 9, the roof supports 16 are connected to the frame 38 of the roof 14 by bolts, screws, pins, or other fasteners that can be installed and removed quickly and easily. As shown in FIG. 10, brackets 52 are mounted to the feed box 12, and the roof supports 16 are mounted to the brackets 52. The brackets 52 can be provided in the form of 2 inch by 2 inch pieces of 14-gauge angle metal (such as steel or aluminum). The roof supports 16 are mounted to the brackets 52, and the brackets are mounted to the feed box 12, by bolts, screws, pins, or other fasteners that can be installed and removed quickly and easily. Preferably, the brackets 52 are removable so that, when disassembled from the feed box 12, they fit inside the feed box. This provides an even more compact packing of the feeder 10. It will be understood that the roof supports 16 can be detachably coupled to the feed box 12 and to the roof 14 by other structures selected for providing a strong and quick and easy connection.

Figure 11:
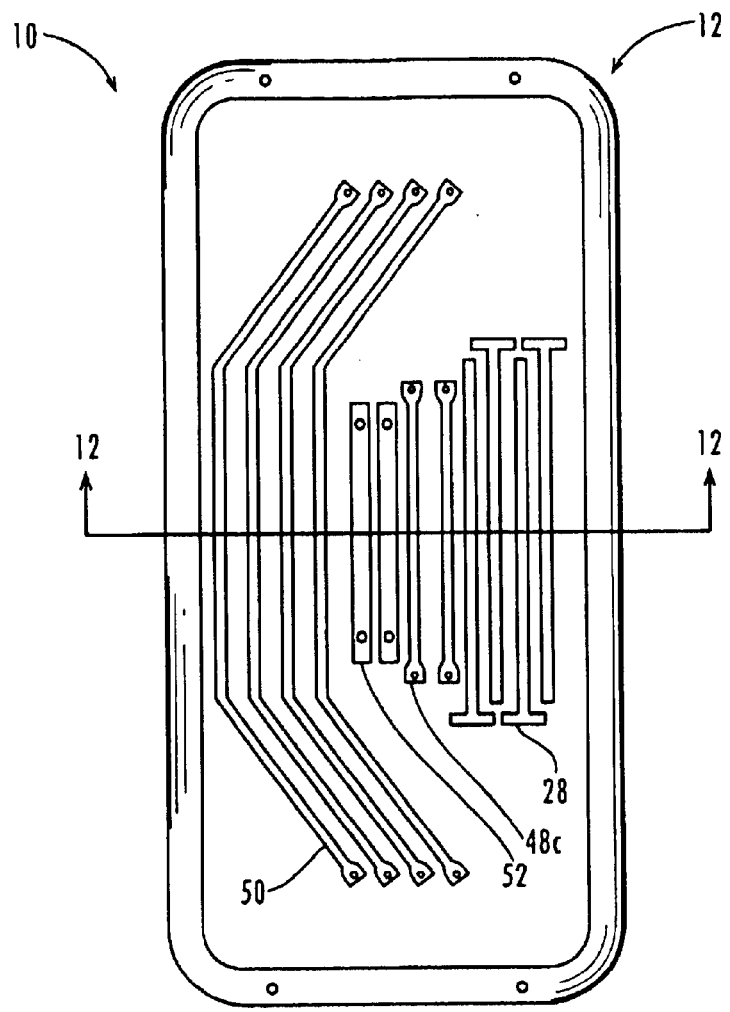
FIG. 11 is a schematic plan view of the deer and game feeder of FIG. 1, shown in a compact, stowed configuration for transport and storage, and shown with the roof removed for clarity of illustration.
Figure 12:
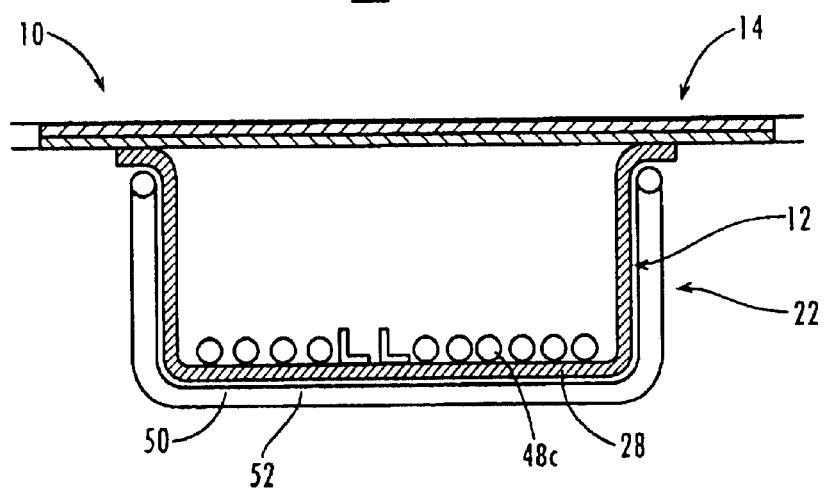
FIG. 12 is a schematic side sectional view of the deer and game feeder of FIG. 11, shown in the compact, stowed configuration for transport and storage, and shown with the roof in place.

As shown in FIGS. 11 and 12, the feeder 10 can be disassembled and packed in a compact and lightweight configuration for storing and transporting. The elongate roof support members 50, the roof support top end segments 46c, the brackets 52, the legs 28, and the mounting hardware can all be disassembled and placed inside the feed box 12. Then the roof 14 can be folded flat and placed atop of the feed box 12 as a lid. If desired, the roof 14 can be strapped or otherwise bound onto the feed box 12. In this disassembled configuration, the feeder 10 is very compact and weighs only about 78 lbs., so it can be easily stored and transported to or from the field. When needed, the feeder 10 can be transported out to the field and set up for use quickly and easily.

In an alternative embodiment, the feed box 12 is made of five panels of sheet metal with four side panels and one bottom panel screwed to the side panels. The roof 14 is made of two panels of sheet metal hingedly coupled together so that it can be folded flat when the feeder is disassembled. The roof supports 16 are provided by four pieces of angle metal attached to the roof panels and to the feed box corners with the feed box 12 positioned up off the ground. The feed box 12 is pre-assembled into a rigid structure during manufacture and then after purchase the roof supports 16 are attached to feed box and the roof 14 in the field.

In a related alternative embodiment, instead of being screwed together, the feed box side panels can be hingedly coupled together so that they can be collapsed flat. In addition, the bottom panel can be hingedly coupled to one side panel and detachably coupled, e.g., by latches, to the opposite side panel, so that all five of the feed box panels can be collapsed flat for storage and transporting.

In another alternative embodiment, the roof 14 is provided by three, four, or more hinged panels that fold flat and compactly when the feeder is disassembled for storage and transport. For example, the roof 14 can include four roof panels configured with three parallel longitudinal fold lines so that the panels fold into a four-panel stack about the same width as the feed box 12. In this way, when the feeder 10 is disassembled with the supports 16 stored in the feed box 12, the roof 14 can be positioned over the feed box 12 for use as a lid. In addition, the feeder 10 includes one or more connectors, e.g., latches, on the roof 14 that engage a lip on the feed box 12, to secure the roof/lid on the feed box.

Alternatively, the roof 14 can include six roof panels configured with one longitudinal center fold line and two perpendicular transverse fold lines so that the panels fold into a six-panel stack that fits in the feed box 12. In addition, the feed box 12 can be configured with an inside ledge, e.g., a bracket mounted to or an offset formed in the side panels, that supports the folded six-panel stack in the feed box 12 with enough space for the supports 16 so that it acts as a lid for the feed box 12.

In yet another alternative embodiment, the roof 14 includes two (or more) rigid frame segments hingedly coupled together and a removable cover that fits onto and is supported by the frame segments. For example, the cover could be made of a flexible material such as a fabric, plastic, or another material selected for strength, durability, and water non-permeability. The cover can be provided with loops, straps, fitted edges, etc., for securing the cover to the frame segments. The frame segments could be collapsible into a compact stack that fits into the feed box 12 for storage. Alternatively, the cover could be provided for use with other roof designs mentioned herein for preventing rainwater from leaking between the roof panels 34 and into the feed box 12.

In still another alternative embodiment, the feed box 12 is made of a flexible material formed into an accordion-style structure that can be collapsed for compact storage and transport or expanded for field use. In another embodiment, the feed box 12 is made of four side panels with each having a top and/or bottom lip that is turned out at a ninety degree angle forming a rectangular notch in each corner for receiving roof supports 16 made of angle metal. In another embodiment, at least two of the feed box side panels extend below the bottom panel to act as legs supporting the feed box 12 up off the ground, and/or at least two of the feed box side panels extend above the top of the feed box 12 to act as supports for the roof 14.

In a further alternative embodiment, the roof supports 16 are collapsible and made of segments that are connected together telescopically, hingedly, or pivotally. For example, the roof supports 16 can be X-shaped and pivotally connected together so that they can be pivoted from an "X" shape during use into alignment with each other forming an "I" shape for storage and transport. In another alternative embodiment, each roof support 16 is made of two pieces, with one piece having one central segment, two top end segments, and two bottom end segments, and the other piece being the third top end segment. In addition, the feed box legs 28 can be hinged so they fold up, telescopic so they retract, or both.

Accordingly, the present invention provides a deer and game feeder 10 that can be assembled quickly and easily in the field for use and later disassembled quickly and easily for removing from the field. Furthermore, the deer and game feeder 10 is lightweight and disassembles into a compact storage kit for ease of transporting and storing. While certain embodiments are described above with particularity for illustrating certain aspects of the invention, these should not be construed as limitations on the scope of the invention. It should be understood, therefore, that the foregoing relates only to exemplary embodiments of the present invention, and that numerous changes may be made therein without departing from the spirit and scope of the invention as defined by the following claims.

What is claimed is:

1. A portable feeder for deer and game comprising: a feed assembly comprising a feed box for holding animal feed; a roof covering the feed box: and one or more roof supports detachably coupled to the feed assembly and the roof, wherein the roof supports each comprise at least one generally vertical central segment, at least three top end segments extending upward from the central segment and angled with respect to each other and with respect to the central segment, and at least two bottom end segments extending downward from the central segment and angled with respect to each other and with respect to the central segment, wherein at least one of the top end segments is detachably coupled to the central segment; and wherein the roof supports fit entirely inside the feed box for storage when the roof supports are disassembled from the feed assembly and the roof, wherein the feeder can be quickly and easily assembled for temporary use, disassembled for transport and storage, and reassembled and disassembled repeatedly.

2. The feeder of claim 1, further comprising a feed box frame for supporting the feed box, the feed box frame including a plurality of removable legs, wherein the legs fit inside the feed box for storage when the legs are disassembled from the feed box frame.

3. The feeder of claim 1, wherein the feed box has a feed box body and a peripheral lip, and further comprising a feed box frame for supporting the feed box, the feed box frame having a peripheral member for supporting the feed box peripheral lip, at least one rib member for supporting the feed box body, and a plurality of legs removably coupled to the peripheral member, wherein the feed box frame legs fit within the feed box when disassembled from the feed box frame.

4. The feeder of claim 1, wherein the roof comprises at least two panels hinged together and shaped and sized so that when the feeder is disassembled with the roof detached from the roof supports, the roof can be collapsed flat with the panels folded over onto each other and positioned over the feed box as a lid.

5. The feeder of claim 4, wherein one of the panels has a portion overlapping the other panel when the panels are unfolded and assembled onto the feeder to direct rainwater from leaking between the roof panels and into the feed box.

6. The feeder of claim 1, wherein the roof comprises at least two half-roofs hinged together, with each half-roof comprising at least two panels that can be folded against each other such that the entire roof can be folded up and stowed inside the feed box.

7. The feeder of claim 1, wherein the feed assembly includes a plurality of leg attachment elements and a plurality of removable legs, wherein the legs are removably coupled to the leg attachment elements in a telescopic arrangement, and the legs fit entirely inside the feed box for storage when the legs are disassembled from the feed assembly.

8. The feeder of claim 7, wherein the leg attachment elements comprise hollow stubs that telescopically receive the legs therein.

9. The feeder of claim 1, wherein each one the roof supports comprises two elongate members each including one of the central segments, one of the top end segments, and one of the bottom end segments.

10. The feeder of claim 1, wherein when one of the roof supports is assembled for use, the central segment is generally vertical, and two of the top end segments, the central segment, and the two bottom end segments all lie in one plane, but the third top end segment does not lie in the same plane.

11. The feeder of claim 10, wherein missing data a first one of the roof supports is detachably mounted at a first end of the feed assembly and a second one of the roof supports is detachably mounted at a second end of the feed assembly, wherein the first and second ends of the feed assembly are opposite each other and the third top end segments are angled toward each other over the feed box.

12. A portable deer and game feeder comprising: a feed assembly including a feeder box and a support frame for supporting the feeder box, the support frame including a plurality of removable legs for supporting the feeder box above the ground; a roof extending over the feeder box and being large enough to overhang the edges of the feeder box; a plurality of removable roof supports for supporting the roof over the feeder box, the roof supports removably attached to the feed assembly and the roof; wherein the roof supports each comprise at least one generally vertical central segment, at least three top end segments extending upward from the central segment and angled with respect to each other and with respect to the central segment, and at least two bottom end segments extending downward from the central segment and angled with respect to each other and with respect to the central segment, wherein at least one of the top end segments is detachably coupled to the central segment; and wherein the removable legs and the removable roof supports are sized and configured to be detached and stowed entirely within the feeder box for transport.

13. A portable deer and game feeder as claimed in claim 12 wherein the feeder box has a top that is flat and the roof comprises at least two roof panels that are hinged together, such that with the roof panels extended in use the roof overhangs the feeder box to a substantial degree, and with both of the roof panels detached from the roof supports and folded flat against one another the roof can be positioned atop the feeder box like a lid.

14. A portable deer and game feeder as claimed in claim 12 wherein the feeder box comprises a one-piece, tub-like, molded plastic element.

15. A portable deer and game feeder as claimed in claim 14 wherein the feeder box has a peripheral flange and further comprising a support framework mounted to the removable legs for engaging the peripheral flange.

16. A portable deer and game feeder as claimed in claim 12 wherein the feeder box support frame includes hollow stubs and the removable legs are removably coupled to the hollow stubs in a telescopic arrangement.

* * * * *